US012785799B2

(12) United States Patent
Curran

(10) Patent No.: US 12,785,799 B2
(45) Date of Patent: Nov. 3, 2026

(54) DISTRIBUTED ACOUSTIC SENSING TO IDENTIFY NON-DISJOINT PATHS IN COMMUNICATIONS NETWORKS

(71) Applicant: Verizon Patent and Licensing Inc., Basking Ridge, NJ (US)

(72) Inventor: David M. Curran, Simpsonville, SC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 467 days.

(21) Appl. No.: 18/485,033

(22) Filed: Oct. 11, 2023

(65) Prior Publication Data

US 2025/0125869 A1 Apr. 17, 2025

(51) Int. Cl.

| | |
|---|---|
| ***H04B 10/07*** | (2013.01) |
| ***G01H 9/00*** | (2006.01) |
| ***H04B 10/032*** | (2013.01) |
| ***H04B 10/071*** | (2013.01) |
| ***H04B 10/27*** | (2013.01) |
| *G01M 11/00* | (2006.01) |
| *H04B 10/03* | (2013.01) |
| *H04J 14/02* | (2006.01) |

(52) U.S. Cl.

CPC ........... *H04B 10/032* (2013.01); *G01H 9/004* (2013.01); *H04B 10/071* (2013.01); *H04B 10/27* (2013.01); *G01M 11/3109* (2013.01); *H04B 10/03* (2013.01); *H04B 10/07* (2013.01); *H04J 14/0287* (2013.01)

(58) Field of Classification Search

CPC .... H04B 10/032; H04B 10/071; H04B 10/27; H04B 10/03; H04B 10/07; G01H 9/004; G01M 11/3109; H04J 14/0287

USPC ................................. 398/1–8, 9–38, 43–103

See application file for complete search history.

(56) References Cited

U.S. PATENT DOCUMENTS

| | | | | |
|---|---|---|---|---|
| 11,101,884 | B1 * | 8/2021 | Campbell | H04B 10/0793 |
| 11,108,463 | B1 * | 8/2021 | Jiang | H04B 10/532 |
| 12,237,996 | B2 * | 2/2025 | Padi | H04L 41/0659 |
| 2012/0014690 | A1 * | 1/2012 | Gruber | H04B 10/07951 398/25 |
| 2016/0241333 | A1 * | 8/2016 | Chen | H04B 10/0731 |
| 2017/0063658 | A1 * | 3/2017 | Ashwood-Smith | H04L 45/22 |
| 2023/0006738 | A1 * | 1/2023 | Chen | H04B 10/071 |
| 2023/0013049 | A1 * | 1/2023 | Luo | G01M 11/3136 |

(Continued)

*Primary Examiner* — Dibson J Sanchez

(57) ABSTRACT

Disclosed herein are system, method, and computer program product embodiments for determining non-disjoint network segments in a fiber optic network. An embodiment transmits, using a signal generator, a signal into a fiber optic network. The embodiment receives, using a receiver, a set of signals comprising at least first and second ones of the set of signals for respective first and second network sections. The embodiment then compares, using a comparator, the first and second ones of the set of signals to determine if a comparison exceeds a similarity threshold. The embodiment then determines a proximity measure between the first and second network segments, using a proximity device, in response to the first and second ones of the set of signals exceeding the similarity threshold. Based on determining the proximity measure is less than a proximity threshold, determine the first and second network segments as a pair of non-disjoint network segments.

20 Claims, 7 Drawing Sheets

(56) References Cited

U.S. PATENT DOCUMENTS

| | | | | |
|---|---|---|---|---|
| 2023/0063952 | A1* | 3/2023 | Edwards | G02B 6/381 |
| 2024/0313858 | A1* | 9/2024 | Jiang | H04B 10/071 |
| 2024/0361176 | A1* | 10/2024 | Lau | G01H 9/004 |

* cited by examiner

DISTRIBUTED ACOUSTIC SENSING TO IDENTIFY NON-DISJOINT PATHS IN COMMUNICATIONS NETWORKS

BACKGROUND

Fiber optic networks offer several advantages over traditional copper-based networks, making them a preferred choice for many modern communication and data transmission applications. The benefits of fiber optic networks include high bandwidth, low latency, and immunity to electromagnetic interference. To meet increasing customer demands, communications service providers (CSPs) commonly purchase or lease dark fiber (i.e., unlit fiber) routes to scale up their services.

Configuring redundant network paths is crucial for ensuring fault tolerance and high network availability in service provider networks. Redundant paths in fiber optic networks refer to setting up multiple physical fiber links between two network points or destinations. Even if a fiber path fails (e.g., due to fiber cuts, equipment failures, or other issues), the additional paths serve as backups or alternative routes for data transmission. However, to avoid common points of failure and ensure fault tolerance, only geographically diverse paths (i.e., physically disjoint fiber paths) should be used as redundant network paths.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
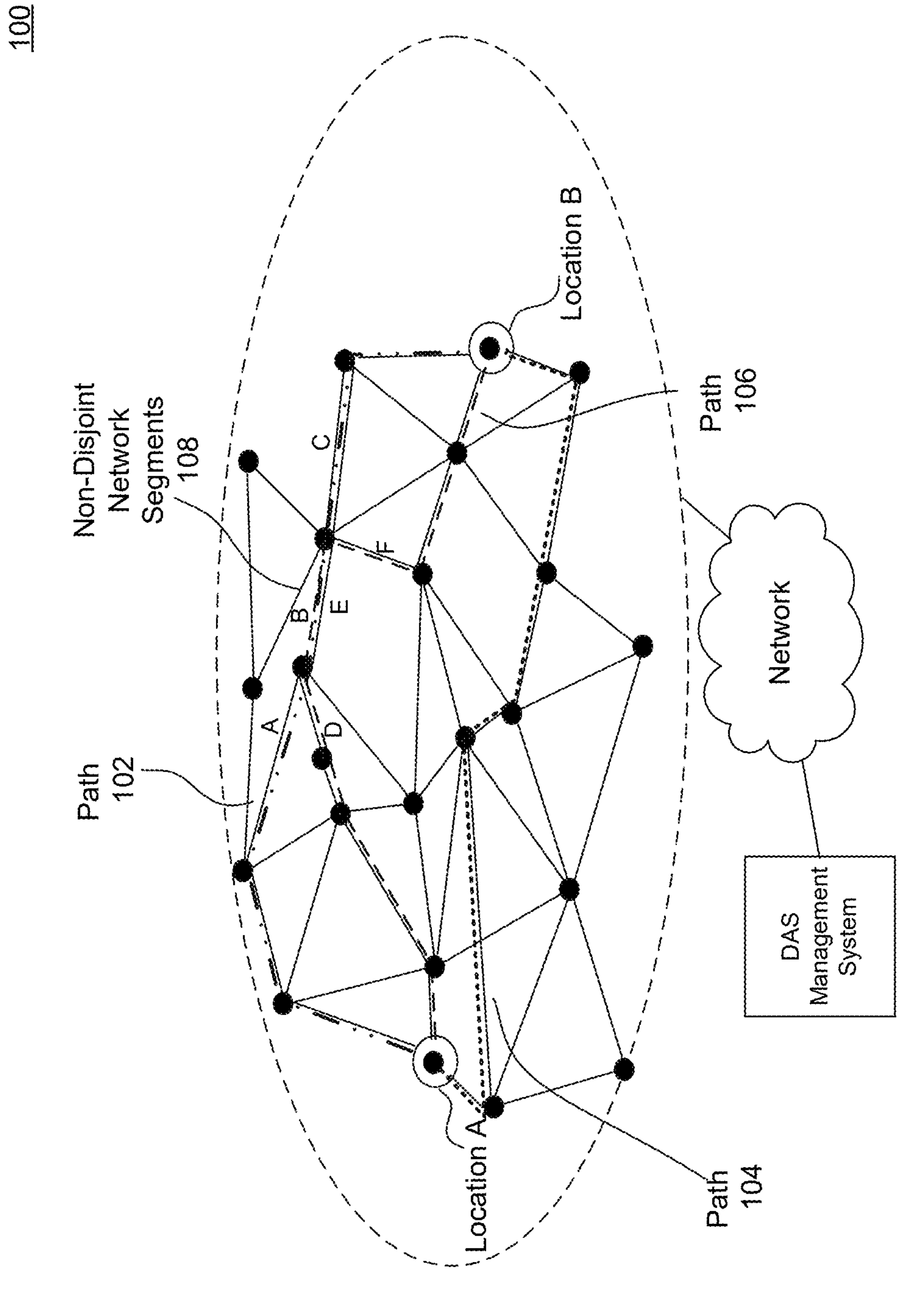
FIG. 1 illustrates an example system of an optical communications network, according to some aspects of this disclosure.

Provided herein are system, apparatus, device, method and/or computer program product embodiments, and/or combinations and sub-combinations thereof, for using distributed acoustic sensing (DAS) to identify non-disjoint fiber paths in an optical communications network. For example, embodiments herein describe generating time domain waveforms of acoustic signatures corresponding to various fiber segments of the optical communications network and computing similarity measures and/or proximity measures between the acoustic signatures to identify non-disjoint fiber paths.

Communications Service Providers (CSPs) commonly purchase or lease dark fiber routes stretching hundreds or thousands of miles. Dark fiber refers to the leasing or sale of individual strands of fiber that are connected (i.e., jumpered) to create an unbroken fiber optical path from one location to another location. The CSP would then utilize this fiber or fibers to create a data path between the locations for the purposes of transmitting data between these locations either for private communications or for access to the public Internet.

In order to prevent disruption, CSPs commonly designate a second geographically diverse path that is intended to be completely disjoint from the primary path. In general, this diverse path is either constructed by the service provider or leased from a third-party with written assurance that no underground or aerial infrastructure elements, such as conduits or telephone poles, are shared. Frequently, such assurances are made with the use of a keyhole markup language (KMZ) file containing the coordinates of prospective fiber routes overlaid onto a map of communications infrastructure, and visual or automated systems are then used to ensure no two fiber paths share the same routes.

However, over time, fiber routes may be unintentionally altered by the primary or a third-party carrier either through work error or during unplanned outages or maintenance. As a result, planned disjoint routes (i.e., redundant paths) may collapse into a common piece of infrastructure creating non-disjoint fiber routes. Configuring non-disjoint fiber routes as redundant paths may create common points of failure in the network, which may result in reduced fault tolerance.

Embodiments describe using distributed acoustic sensing technique to identify non-disjoint fiber paths in an optical communications network so as to preclude using non-disjoint fiber paths as redundant paths. Embodiments describe using DAS units to generate time domain waveforms of acoustic signatures corresponding to each fiber segment of the optical communications network. In some embodiments, the DAS units may transmit the generated acoustic signatures to a DAS management system. The DAS management system may then compute a similarity measure (e.g., DTS distance, cross-correlation coefficient, and/or Euclidian distance) between each pair of the received acoustic signatures. Based on a determination that the similarity measure between a pair of acoustic signals exceeds a threshold, the DAS management system may determine a proximity measure between the corresponding network segment pair. Next, based on a determination that the proximity measure is less than a proximity threshold, the corresponding network segment pair may be classified as a non-disjoint network pair.

FIG. 1 illustrates system 100 of an optical communications network, according to some aspects of this disclosure. In one example, system 100 includes fiber optic network 110, having several interconnected optical fiber links. According to some aspects, fiber optic network 110 includes several passive and active optical components (not shown). Fiber optic network 110 may include passive optical components, such as fiber optic couplers, fiber optic splitters, wavelength division multiplexers, optical isolators, fiber optic attenuators, fiber optic panels, fiber optic splices, optical filter, and/or the like. Fiber optic network 110 may include active optical components such as optical amplifiers, optical transceivers, optical switches, optical cross-connects, optical repeaters, optical add-drop multiplexers, and/or the like. Furthermore, fiber optic network 110 may include a combination of several types of fiber, such as single-mode fiber, multi-mode fiber, steep-index fiber, graded-index fiber, and/or the like.

According to some aspects, system 100 may include DAS units (not shown) installed at various locations in fiber optic network 110. For example, DAS units may be installed proximate to optical connecting nodes (i.e., devices such as optical switches, optical add-drop multiplexers, fiber patch panels, and the like). According to some aspects, DAS units may be installed at regular distances throughout fiber optic network 110. Each DAS unit may be used to monitor one or more fiber segments of fiber optic network 110. A fiber segment may be a portion of an optical fiber located between two DAS units.

As an example, and not as a limitation, FIG. 1 illustrates DAS units installed at various connecting nodes throughout fiber optic network 110. FIG. 1 also illustrates multiple potential communication paths between locations A and B (e.g., Fiber paths 102, 104, and 106), with each fiber path comprising multiple segments separated by DAS units. As an example, and not as a limitation, each DAS unit may be configured to monitor one or more fiber segments located to the right of the DAS unit. According to some aspects, geographical data (e.g., location coordinates, GPS data) corresponding to the DAS units of the fiber optic network 110 may be stored in a keyhole markup language (KLM) file.

According to some aspects, system 100 includes a DAS management system 112 connected to fiber optic network 110 via the Internet or a service provider network 114. Each DAS unit may be configured to communicate with DAS management system 112 using a wireless link (e.g., cellular, satellite, Wi-fi, etc.), wired links (e.g., coaxial cable, Ethernet cable, fiber optic cable, etc.), and/or combinations thereof. Each DAS unit generates one or more time-domain signatures, each corresponding to a fiber segment, and transmits them to the DAS management system 112.

According to some aspects, DAS management system 112 may be configured to receive time domain signatures from various DAS units and identify non-disjoint fiber paths in fiber optic network 110. For example, fiber paths 102 and 104 do not have any fiber segments that intersect and/or are in close proximity to each other. Hence, DAS management system 112 may classify fiber paths 102 and 104 as disjoint fiber paths. On the other hand, fiber paths 102 and 106 share a fiber segment. Hence, DAS management system 112 may classify fiber paths 102 and 106 as non-disjoint fiber paths.

Figure 2:
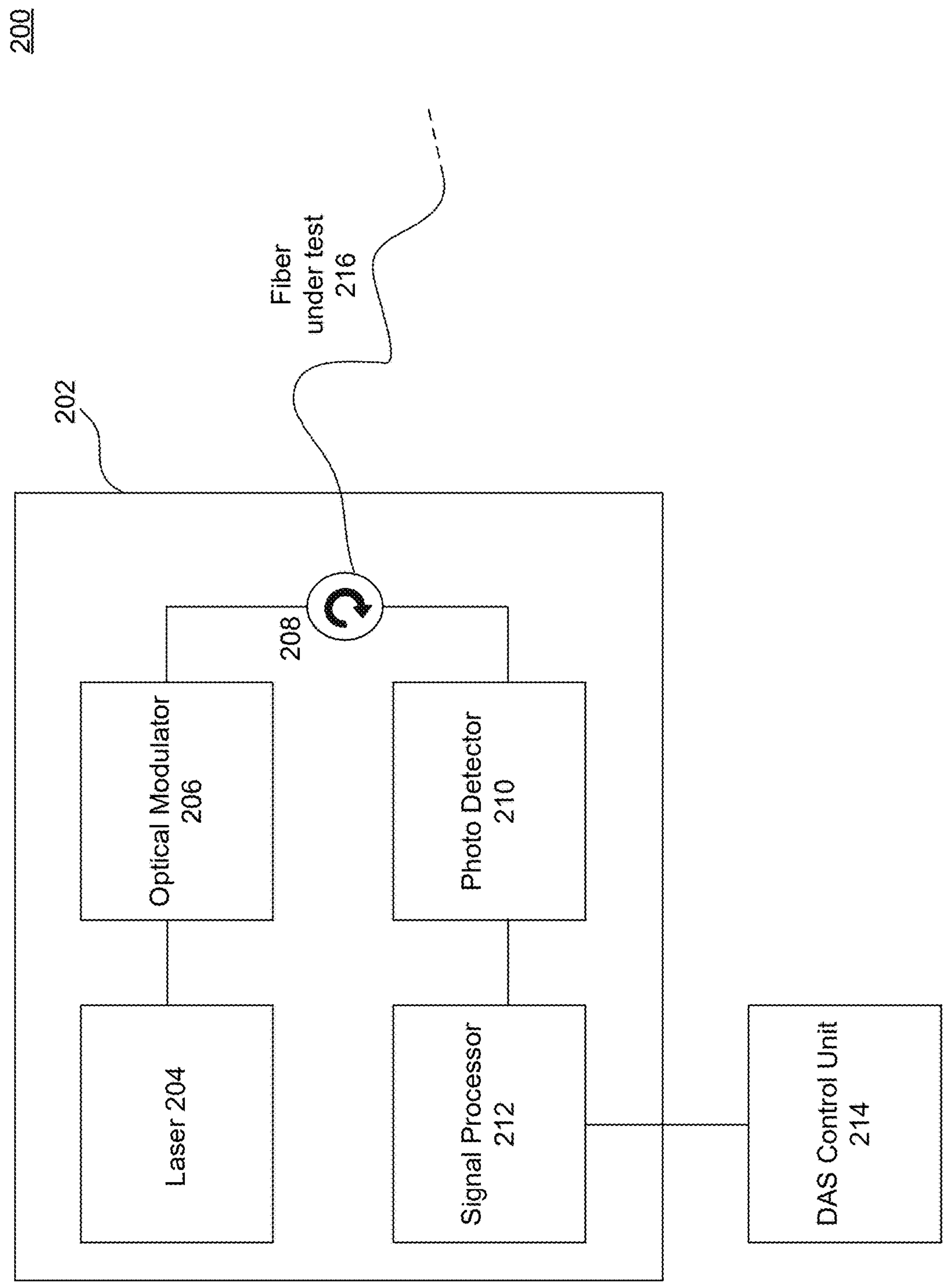
FIG. 2 illustrates an example distributed acoustic sensing (DAS) unit for generating time-domain signatures corresponding to one or more fiber segments, according to some aspects of this disclosure.

FIG. 2 illustrates an example DAS unit 200 for generating time-domain signatures corresponding to one or more fiber segments, according to some aspects of this disclosure. According to some aspects, DAS unit 200 includes a laser 204, an optical modulator 206, an optical circulator 208, a photo detector 210, and a signal processor 212.

According to some aspects, DAS unit 200 uses laser 204 to generate coherent radiation input. An optical modulator 206, which is an optical transmitter, modulates the coherent optical radiation generated by laser 204 and launches optical pulses into fiber segment 216. Any optical radiation that is backscattered (e.g., due to Rayleigh backscattering as the optical pulses travel through fiber segment 216 and is directed towards photo detector 210 by an optical circulator 208. Photo detector 210, which is an optical receiver, converts the optical radiation into electric signals, which are then sampled by signal processor 212 to generate a time-domain waveform of the acoustic signature corresponding to fiber segment 216. DAS unit 202 may relay the acoustic signatures to DAS transceiver unit 214. DAS transceiver unit 214 may, in turn, transmit the acoustic signature corresponding to fiber segment 216 to DAS management system 112.

Figure 3:
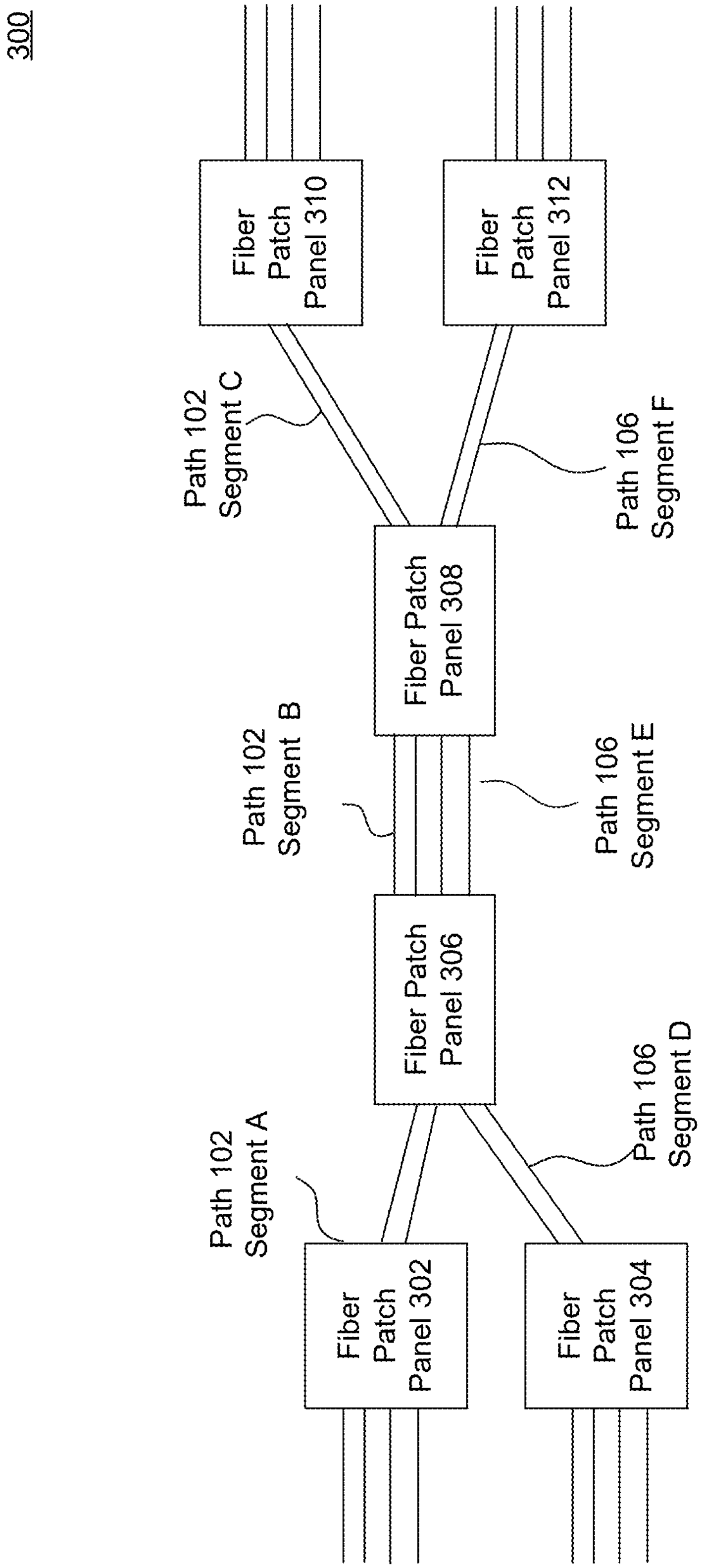
FIG. 3 illustrates exemplary interconnected optical fiber segments of a fiber optic network, according to some aspects of this disclosure.

FIG. 3 illustrates exemplary interconnected optical fiber segments of fiber optic network 110, according to some aspects of this disclosure. By way of an example, and not as a limitation, optical fiber segments may be interconnected by fiber patch panels, as illustrated in FIG. 3. Alternatively, or in addition, optical fiber segments may be interconnected by optical connecting devices such as optical switches, optical cross-connects, optical add-drop multiplexers, and the like. According to some aspects, each fiber patch panel can be connected to other adjacent patch panels by multiple fiber optic segments.

In the example of FIG. 3, a fiber optic segment between fiber patch panels 302 and 306 corresponds to fiber segment A of fiber path 102, a fiber optic segment between fiber patch panels 306 and 308 corresponds to fiber segment B of fiber path 102, and a fiber optic segment between fiber patch panels 308 and 310 corresponds to fiber segment C of fiber path 102. Similarly, a fiber optic segment between fiber patch panels 304 and 406 corresponds to fiber segment D of path 106, a fiber optic segment between fiber patch panels 306 and 308 corresponds to fiber segment E of fiber path 106, and a fiber optic segment between fiber patch panels 308 and 312 corresponds to fiber segment F of fiber path 106.

According to some aspects, one or more DAS units 202 may be installed at each patch panel in the example of FIG. 3. Each DAS unit at a fiber patch panel may be configured to perform acoustic sensing of the one or more fiber optic segments that are connected to the fiber patch panel. For example, a DAS unit at fiber patch panel 302 may be configured to perform acoustic sensing of fiber segment A of path 102, and a DAS unit at fiber patch panel 304 may be configured to perform acoustic sensing of fiber segment D of path 106. Furthermore, a DAS unit at fiber patch panel 306 may be configured to perform acoustic sensing of fiber segment B of path 102 and fiber segment E of path 106. Similarly, a DAS unit at fiber patch panel 308 may be configured to perform acoustic sensing of fiber segment C of path 102 and fiber segment F of path 106.

According to some aspects, the DAS units installed at the fiber path panels may perform acoustic sensing of one or more fiber segments to generate time-domain signatures corresponding to the sensed fiber segments. In the example of FIG. 3, a DAS unit at fiber patch panel 302 may generate a TD signature corresponding to fiber segment A of path 102, and a DAS unit at fiber patch panel 304 may generate a TD signature corresponding to fiber segment D of path 106. Furthermore, a DAS unit at fiber patch panel 306 may generate TD signatures corresponding to fiber segment B of path 102 and fiber segment E of path 106. Similarly, a DAS unit at fiber patch panel 308 may be configured to generate TD signatures corresponding to fiber segment C of path 102 and fiber segment F of path 106.

According to some aspects, each DAS unit may transmit the generated TD signatures to DAS management system 112 using the transceiver of its DAS control unit 214.

According to some aspects, all DAS units in a geographic area may be configured to periodically generate one or more TD signatures and transmit them to DAS management system 112.

Alternatively, or in addition, DAS management system 112 may broadcast a request to all DAS units in a geographic area to send TD signatures. In response to receiving the request, each DAS unit may perform acoustic sensing of one or more fiber segments, generate corresponding TD signatures, and transmit the TD signatures to DAS management system 112.

Figure 4:
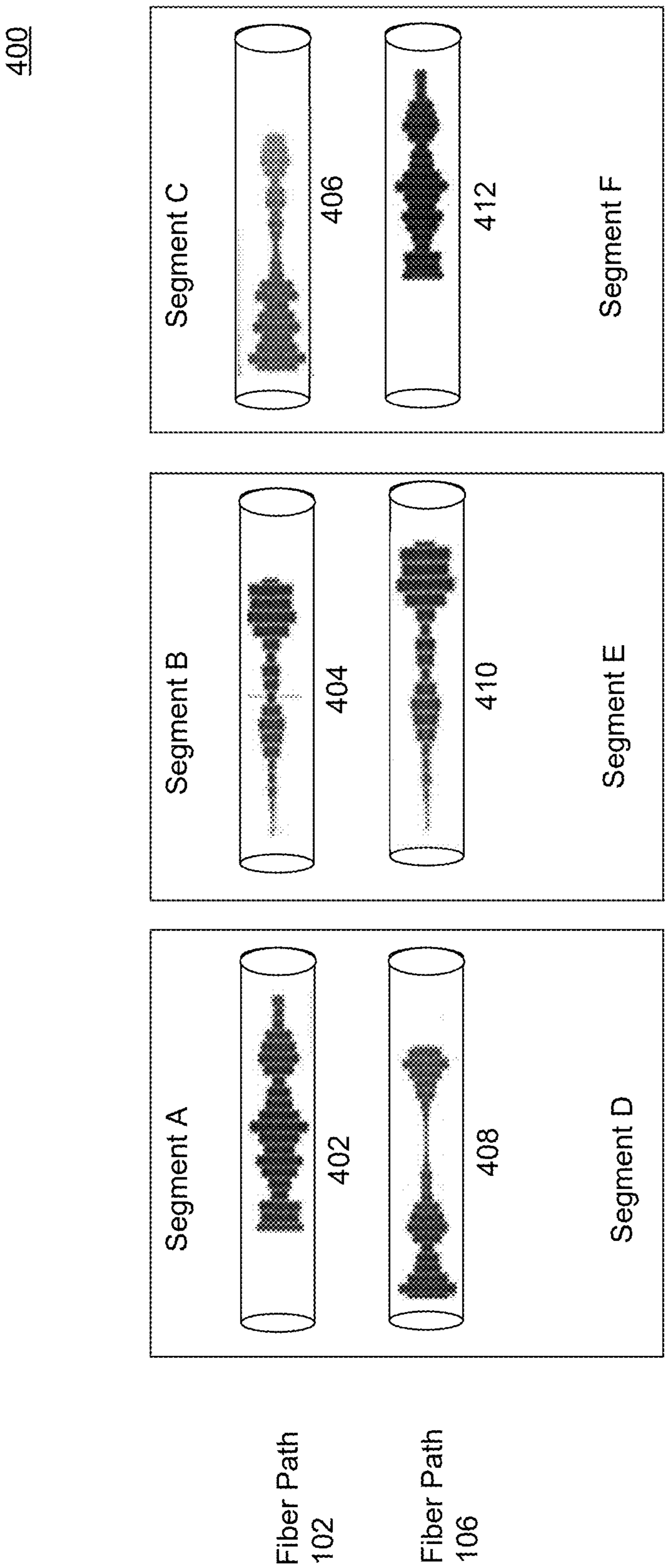
FIG. 4 illustrates exemplary time domain (TD) waveforms of acoustic signatures generated by various DAS units of fiber optic network 110, according to some aspects of this disclosure, according to some aspects of this disclosure.

FIG. 4 illustrates exemplary time domain (TD) waveforms of acoustic signatures generated by various DAS units of fiber optic network 110, according to some aspects of this disclosure. According to some aspects, an acoustic signature of a fiber segment corresponds to the unique acoustic waveform produced by one or more sources that cause vibration along the fiber segment. The vibrations along a fiber segment may be generated by a wide range of sources, such as fluid flow in pipelines, ground movements, machinery operations, etc., that are located near the fiber segment. Therefore, the acoustic signature of a fiber segment is determined primarily by the physical location of the fiber segment.

According to some aspects, determining a measure of similarity between acoustic signatures of two fiber segments may provide an indication of how closely they are located to one another in the fiber optic network 110. For example, fiber segments of fiber optic network 110 that are co-located may have identical acoustic signatures. Furthermore, fiber segments that are located in within a close range of each other may have similar, if not identical, acoustic signals.

In the example of FIG. 4, acoustic signatures 402, 404, and 406 correspond to fiber segments A, B, and C, respectively, of path 102. In addition, acoustic signatures 408, 410, and 412 correspond to fiber segments D, E, and F, respectively, of path 106. In the example of FIG. 4, the TD waveform of acoustic signature 402 is substantially dissimilar from the TD waveforms of acoustic signatures 408, 410, and 412, indicating that fiber segment A of path 102 is not located within close range of fiber segments D, E, and F of path 106. Furthermore, the TD waveform of acoustic signature 406 is substantially dissimilar from the TD waveforms of acoustic signatures 408, 410, and 412, indicating that fiber segment C of path 102 is not located within a close range of fiber segments D, E, and F of path 106. On the other hand, the TD waveform of acoustic signature 404 is similar to the TD waveform of acoustic signature 410 indicating that fiber segment B of path 102 is located within a close range of fiber segment E of path 106.

According to some aspects, the similarity between TD waveforms of various acoustic signatures may be quantified using similarity measures, such as dynamic time warping (DTW) distance, cross correlation coefficient, mean squared error (MSE), Euclidean distance, and/or the like. According to some aspects, DTW may be used for measuring the similarity between two acoustic signatures, especially when they may have different lengths or exhibit some temporal distortion. The DTW technique may be used to calculate a DTW distance between two acoustic signatures. According to some aspects, when two acoustic signatures that are to be compared have different lengths (i.e., the number of samples corresponding to the TD waveforms are not equal), DTW may be used to align the two acoustic signals and calculate a DTW distance them. The DTW distance may represent the distance or dissimilarity between the two acoustic signatures. According to some aspects, a similarity measure of two acoustic signatures may be determined as a scaled reciprocal of their DTW distance.

According to some aspects, a cross-correlation operation may be used to quantify the similarity between two acoustic signatures. The cross-correlation operation computes a correlation coefficient that indicates the degree of similarity between the two acoustic signatures. According to some aspects, the Euclidian distance between two acoustic signals may be used to quantify the degree of similarity between them.

According to some aspects, DAS management system 112 of system 100 may receive acoustic signatures (e.g., acoustic signatures 402, 404, 406, 408, 410, and 412) from various DAS units within a geographic area. DAS management system may then calculate a measure of similarity (e.g., using DTS distance, cross-correlation coefficient, and/or Euclidian distance) between the TD waveforms of each pair of acoustic signatures. According to some aspects, a pair of acoustic signatures having a high degree of similarity (e.g., acoustic signatures 404 and 410) indicates that the two fiber segments corresponding to the acoustic signatures are located within a close range of each other. According to some aspects, since the two fiber segments have similar acoustic signatures, the paths that include these fiber segments are classified as non-disjoint paths.

Figure 5:
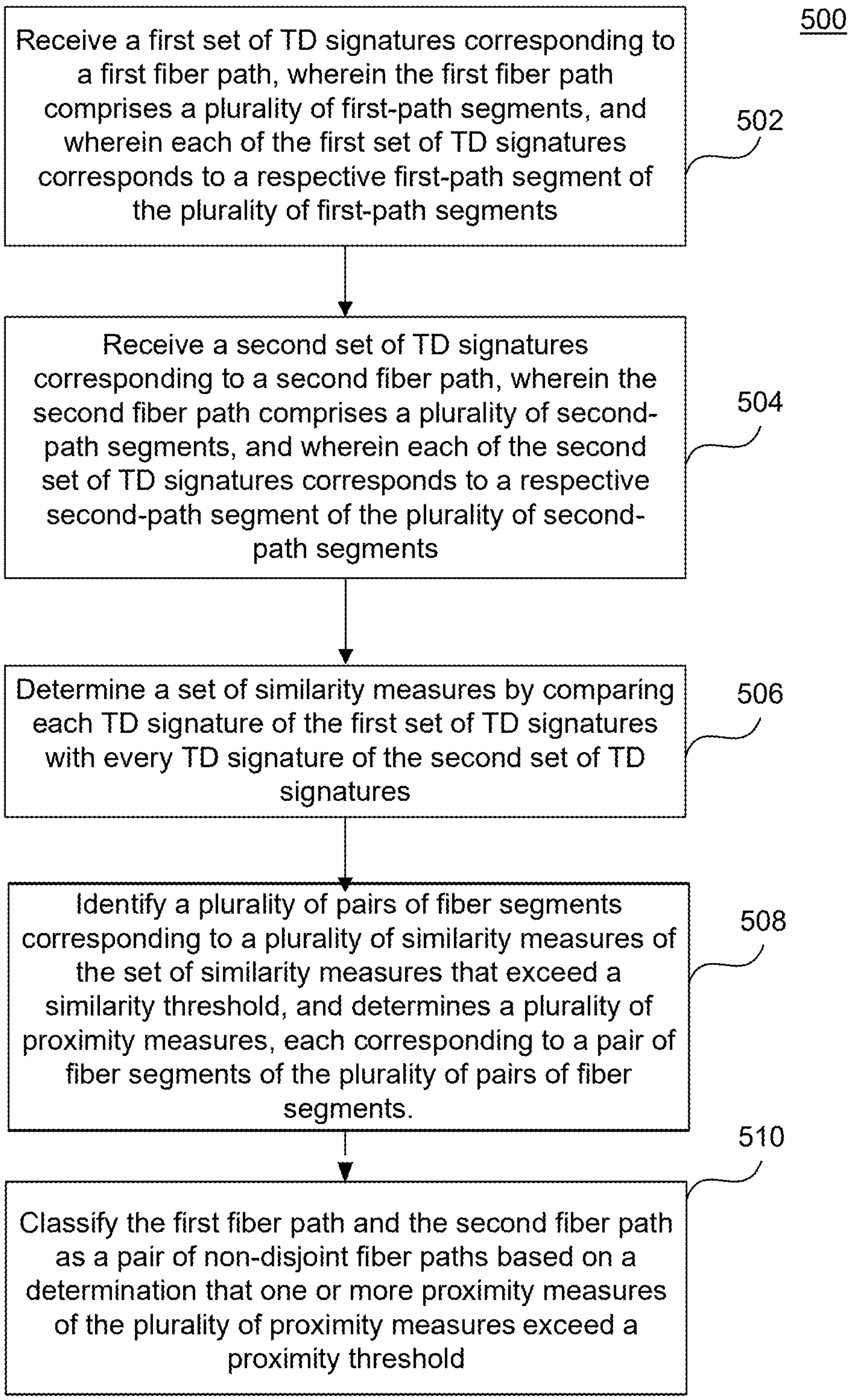
FIG. 5 is a flowchart for a method for using DAS to identify non-disjoint fiber paths in an optical communications network, according to some aspects of this disclosure.

FIG. 5 is a flowchart for a method 500 according to some aspects of the disclosure. For example, method 500 can use distributed acoustic sensing (DAS) to identify non-disjoint fiber paths in an optical communications network, according to some aspects of this disclosure. Method 500 can be performed by processing logic that can comprise hardware (e.g., circuitry, dedicated logic, programmable logic, microcode, etc.), software (e.g., instructions executing on a processing device), or a combination thereof. As a convenience and not a limitation, FIG. 5 may be described with regard to elements of FIGS. 1-4 and 7, for example, the functions of FIG. 5 can be performed by DAS management system 112. For example, DAS management system 112 can perform, or cause to perform, the functions of FIG. 5 in conjunction with other elements of FIGS. 2 and 3. Method 500 can also be performed by computer system 700 of FIG. 7. However, method 500 is not limited to the specific aspects depicted in those figures, and other systems may be used to perform the method as will be understood by those skilled in the art. It is to be appreciated that not all operations may be needed, and the operations may not be performed in the same order as shown in FIG. 5.

At 502, DAS management system 112 receives a first set of TD signatures (e.g., acoustic signatures) corresponding to a first fiber path, wherein the first fiber path comprises a plurality of first-path segments, and wherein each of the first set of TD signatures corresponds to a respective first-path segment of the plurality of first-path segments. According to some aspects, the first set of TD signatures are generated by a set of DAS units corresponding to the first fiber path in response to receiving a request, from DAS management system 112, to generate TD signatures.

At 504, DAS management system 112 receives a second set of TD signatures corresponding to a second fiber path, wherein the second fiber path comprises a plurality of second-path segments, and wherein each of the second set of TD signatures corresponds to a respective second-path segment of the plurality of second-path segments. According to some aspects, the second set of TD signatures are generated by a set of DAS units corresponding to the second fiber path in response to receiving a request, from DAS management system 112, to generate TD signatures. According to some aspects, the first fiber path and the second fiber path may be located within a geographic region. According to some aspects, the first fiber path and the second fiber path may be located within a pre-determined proximity of each other (e.g., within 10 miles of each other, within 50 miles of each other, within 100 miles of each other, or other suitable value). Alternatively, or in addition, a request to generate acoustic signatures may be sent to a set of DAS units that are known (e.g., based on information in a KMZ file) to be located within a pre-determined proximity (e.g., within 10 miles of each other, within 50 miles of each other, within 100 miles of each other, or other suitable value).

At 506, DAS management system 112 determines a set of similarity measures by comparing each TD signature of the first set of TD signatures with every TD signature of the second set of TD signatures. According to some aspects, the similarity between TD signatures may be quantified using similarity measures, such as dynamic time warping (DTW) distance, cross correlation coefficient, mean squared error (MSE), Euclidean distance, and/or the like. According to some aspects, DAS management system may then calculate similarity measures (e.g., using DTS distance, cross-correlation coefficient, and/or Euclidian distance) between the TD signature of the first set of TD signatures with every TD signature of the second set of TD signatures. According to some aspects, a pair of acoustic signatures having a high degree of similarity (e.g., acoustic signatures 404 and 410) indicates that the two fiber segments corresponding to the acoustic signatures are located within a close range of each other.

At 508, DAS management system 112 identifies a plurality of pairs of fiber segments corresponding to a plurality of similarity measures of the set of similarity measures that exceed a similarity threshold, and determines a plurality of proximity measures, each corresponding to a pair of fiber segments of the plurality of pairs of fiber segments. According to some aspects, two fiber optic segments of fiber optic network 110 may have similar TD signatures (e.g., due to the presence of similar types of vibration-sources along the two fiber segments) even though they are not within close range of each other. Determining proximity measures between pairs of fiber optic segments enables the DAS management system to identify between geographically diverse segments with similar TD signatures. According to some aspects, even though two fiber segments have similar TD signatures, disjoint fiber routes may be configured over the two fiber segments when they are not within a close range of each other. According to some aspects, the proximity measure between the various network segments may be determined based on a keyhole markup language zipped (KMZ) file corresponding to the fiber optic network 110.

According to some aspects, to determine whether the similarity measure exceeds a similarity threshold, the DAS management system normalizes the first TD signature and the second TD signature to eliminate variability between the first TD signature and the second TD signature due to a difference in lengths of the first network segment and the second network segment; and determines a similarity measure between normalized first TD signature and normalized second TD signature. According to some aspects, to determine whether the similarity measure exceeds a similarity threshold, the DAS management system normalizes the first TD signature and the second TD signature to eliminate variability between the first TD signature and the second TD signature due to a difference in types of fiber of the first network segment and the second network segment; and determines a similarity measure between normalized first TD signature and normalized second TD signature. According to some aspects, the first TD signature and the second TD signature are normalized using a dynamic time warping technique.

At 510, DAS management system 112 classifies the first fiber path and the second fiber path as a pair of non-disjoint fiber paths based on a determination that one or more proximity measures of the plurality of proximity measures exceed a proximity threshold. According to some aspects, the proximity threshold may have a value of 100 feet, 500 feet, 1000 feet, 2000 feet, or other suitable values. According to some aspects, the DAS management system 112 may determine the proximity threshold based on the geographic density of the DAS units located in a geographic area of the fiber optic network 110. According to some aspects, the proximity threshold may have a smaller value when the DAS units are densely located in a geographic area of interest. Similarly, the proximity threshold may have a larger value when the DAS units are sparsely located in a geographic area of interest.

Figure 6:
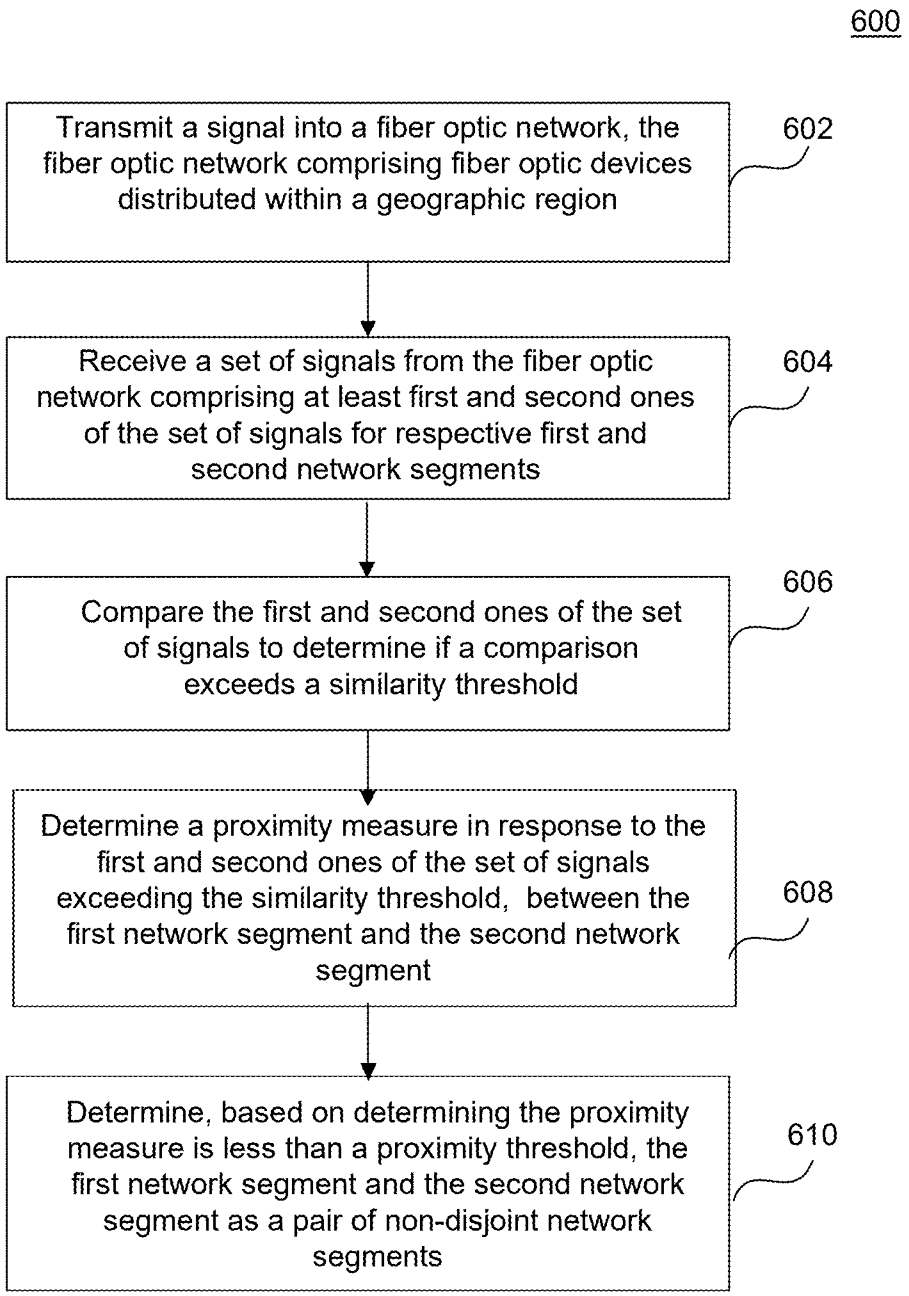
FIG. 6 is another flowchart for the method for using DAS to identify non-disjoint fiber paths in an optical communications network, according to some aspects of this disclosure.

FIG. 6 is a flowchart for a method 600 according to some aspects of this disclosure. For example, method 600 can be for using distributed acoustic sensing (DAS) to identify non-disjoint fiber paths in an optical communications network, according to some aspects of this disclosure. Method 600 can be performed by processing logic that can comprise hardware (e.g., circuitry, dedicated logic, programmable logic, microcode, etc.), software (e.g., instructions executing on a processing device), or a combination thereof. As a convenience and not a limitation, FIG. 6 may be described with regard to elements of FIGS. 1-4 and 7, for example, the functions of FIG. 6 can be performed by DAS management system 112. For example, DAS management system 112 can perform, or cause to perform, the functions of FIG. 6 in conjunction with other elements of FIGS. 2 and 3. Method 600 can also be performed by computer system 700 of FIG. 7. But method 600 is not limited to the specific aspects depicted in those figures, and other systems may be used to perform the method as will be understood by those skilled in the art. It is to be appreciated that not all operations may be needed, and the operations may not be performed in the same order as shown in FIG. 6.

At 602, a signal is transmitted into a fiber optic network, using a signal generator, where the fiber optic network includes fiber optic devices (e.g., distributed acoustic units 202) distributed within a geographic region. According to some aspects, an optical signal generator (e.g., the combination of laser 204 and optical modulator 206) of a DAS unit 202 may be configured to generate and transmit a test signal into a fiber segment of fiber optic network 110. According to some aspects, the signal generator may be triggered in response to a request from DAS management system 112 to generate an acoustic signature corresponding to the fiber segment. According to some aspects, for efficiency purposes, a request to generate acoustic signatures from the DAS management system may be broadcast only to the DAS units located within a specific geographic region. Alternatively, or in addition, a request to generate acoustic signatures may be sent to a set of DAS units that are located within a pre-determined proximity (e.g., within 10 miles of each other, within 50 miles of each other, within 100 miles of each other, or other suitable value). Alternatively, or in addition, a request to generate acoustic signatures may be sent to a set of DAS units that are associated with a group of network segments that are known (e.g., based on information in a KMZ file) to be within a pre-defined proximity of each other (e.g., within 10 miles, within 50 miles, within 100 miles of each other, or other suitable value).

At 604, a set of signals are received using a receiver from the fiber optic network comprising at least the first and second ones of the set of signals for the respective first and second network segments. According to some aspects, the set of received signals are generated by a set of DAS units in the fiber optic network in response to receiving a request, from DAS management system 112, to generate acoustic signatures. According to some aspects, a receiver of the DAS management system receives signals (e.g., time domain waveforms of acoustic signatures) corresponding to a first network segment and a second network segment of optical network 112. The DAS associated with the first segment transmits a first acoustic signature, and the DAS associated with the second segment transmits a second acoustic signature. The first and the second acoustic signatures are received by the DAS management system 112 from the DAS units 202 associated with the first and second network segments.

At 606, the first and second ones of the set of signals are compared using a comparator to determine if a comparison exceeds a similarity threshold. According to some aspects, DAS management system 112 may calculate a similarity measure, using a comparator module, to quantify the degree of similarity between the received acoustic signatures. According to some aspects, the similarity between various acoustic signatures may be quantified using similarity measures, such as dynamic time warping (DTW) distance, cross-correlation coefficient, mean squared error (MSE), Euclidean distance, and/or the like. According to some aspects, DAS management system 112 then determines whether the similarity measure between the first and the second acoustic signatures exceeds a similarity threshold. According to some aspects, DAS management system 112 may determine if a scaled reciprocal of DTW distance between the first and second acoustic signals exceeds a similarity threshold. According to some aspects, the similarity threshold may be determined based on a quality of service (e.g., a level of fault tolerance and/or a level of network availability) requirement.

At 608, in response to the first and second ones of the set of signals exceeding the similarity threshold, a proximity measure between the first network segment and the second network segment is determined using a proximity device. According to some aspects, proximity measures may be determined based on a keyhole markup language zipped (KMZ) file corresponding to the fiber optic network 110. According to some aspects, a proximity measure may be the physical distance between two segments of the fiber optic network 110.

At 610, based on determining the proximity measure is less than a proximity threshold, the first network segment and the second network segment are determined as a pair of non-disjoint network segments. According to some aspects, the proximity threshold may have a value of 100 feet, 500 feet, 1000 feet, 2000 feet, or other suitable values. According to some aspects, the proximity threshold may be determined based on the geographic density of the DAS units located in the geographic region. According to some aspects, the proximity threshold may have a smaller value when the DAS units are densely located in the geographic region. Similarly, the proximity threshold may have a larger value when the DAS units are sparsely located in the geographic region. According to some aspects, the proximity measure between the first network segment and the second network segment may be determined based on a keyhole markup language zipped (KMZ) file.

According to some aspects, non-disjoint fiber paths (i.e., fiber optic path pairs that include non-disjoint network segments) are precluded from being used as redundant paths in fiber optic network 110.

Figure 7:
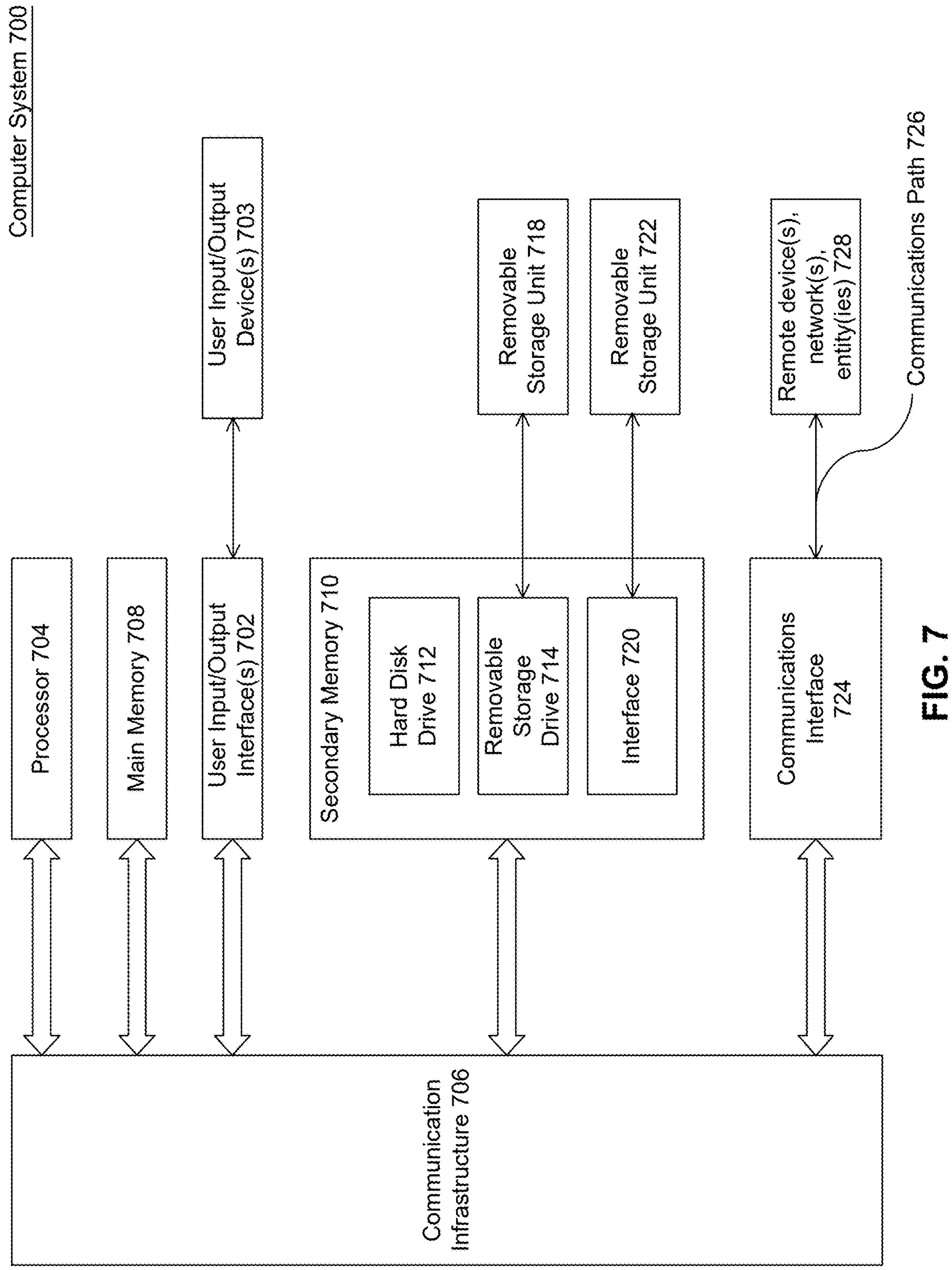
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system comprising:

a signal generator configured to transmit a signal into a fiber optic network, the fiber optic network comprising fiber optic devices distributed within a geographic region;

a receiver configured to receive a set of signals from the fiber optic network comprising at least first and second ones of the set of signals for respective first and second network segments;

a comparator coupled to the receiver, the comparator configured to compare the first and second ones of the set of signals to determine if a comparison exceeds a similarity threshold; and a proximity device configured to, in response to a determination that the first and second ones of the set of signals exceed the similarity threshold, determine a proximity measure between the first network segment and the second network segment, wherein upon determining the proximity measure is less than a proximity threshold, classifying the first network segment and the second network segment as a pair of non-disjoint network segments.

2. The system of claim 1, further comprising:

a network device configured to determine a first fiber path and a second fiber path, each comprising a plurality of network segments of the fiber-optic network, between a source and a destination such that if the first fiber path includes the first network segment the second fiber path does not include the second network segment.

3. The system of claim 1, wherein, to determine whether the comparison exceeds the similarity threshold, the comparator is further configured to:

normalize the first and second ones of the set of signals to eliminate variability between the first and second ones of the set of signals due to a difference in lengths of the first network segment and the second network segment; and determine a correlation coefficient between normalized first one of the set of signals and normalized second one of the set of signals.

4. The system of claim 3, wherein the first and second ones of the set of signals are normalized using a dynamic time warping technique.

5. The system of claim 1, wherein, to determine whether the comparison exceeds the similarity threshold, the comparator is further configured to:

normalize the first and second ones of the set of signals to eliminate variability between the first and second ones of the set of signals due to a difference in types of fiber of the first network segment and the second network segment; and determine a correlation coefficient between normalized first one of the set of signals and normalized second one of the set of signals.

6. The system of claim 1, wherein the fiber optic devices are a set of fiber-optic acoustic sensing devices.

7. The system of claim 1, wherein the set of signals are a set of time-domain (TD) signatures received from a plurality of fiber-optic acoustic sensing devices distributed within a geographic area.

8. The system of claim 1, wherein the proximity measure between the first network segment and the second network segment is determined based on a keyhole markup language zipped (KMZ) file.

9. The system of claim 1, wherein, to receive the set of signals, the receiver is further configured to:

configure each of the fiber optic devices to:

transmit a reference optical signal over a respective fiber-optic network segment within a geographic area;

determine a respective signal based on reflected and back-scattered optical signals; and transmit the set of signals to a distributed acoustic sensing control unit of the receiver.

10. A method, comprising:

transmitting, using a signal generator, a signal into a fiber optic network, the fiber optic network comprising fiber optic devices distributed within a geographic region;

receiving, using a receiver, a set of signals from the fiber optic network comprising at least first and second ones of the set of signals for respective first and second network segments;

comparing, using a comparator coupled to the receiver, the first and second ones of the set of signals to determine if a comparison exceeds a similarity threshold;

determining a proximity measure, using a proximity device, in response to a determination that the first and second ones of the set of signals exceeding the similarity threshold, between the first network segment and the second network segment; and determining, based on determining the proximity measure is less than a proximity threshold, the first network segment and the second network segment as a pair of non-disjoint network segments.

11. The method of claim 10, further comprising:

configuring a first fiber path and a second fiber path, each comprising a plurality of network segments of the fiber-optic network, between a source and a destination such that if the first fiber path includes the first network segment, the second fiber path does not include the second network segment.

12. The method of claim 10, wherein, the determining whether the comparison exceeds the similarity threshold further comprises:

normalizing the first and second ones of the set of signals to eliminate variability between the first and second ones of the set of signals due to a difference in lengths of the first network segment and the second network segment; and determining a correlation coefficient between normalized first one of the set of signals and normalized second one of the set of signals.

13. The method of claim 12, wherein the first and second ones of the set of signals are normalized using a dynamic time warping technique.

14. The method of claim 10, wherein, the determining whether the comparison exceeds the similarity threshold further comprises:

normalizing the first and second ones of the set of signals to eliminate variability between the first and second ones of the set of signals due to a difference in types of fiber of the first network segment and the second network segment; and determining a correlation coefficient between normalized first one of the set of signals and normalized second one of the set of signals.

15. The method of claim 10, wherein the proximity measure between the first network segment and the second network segment is determined based on a keyhole markup language zipped (KMZ) file.

16. A non-transitory computer-readable medium (CRM) having instructions stored thereon that, when executed by at least one computing device, causes the at least one computing device to perform operations comprising:

transmitting, using a signal generator, a signal into a fiber optic network, the fiber optic network comprising fiber optic devices distributed within a geographic region;

receiving, using a receiver, a set of signals from the fiber optic network comprising at least first and second ones of the set of signals for respective first and second network segments;

comparing, using a comparator coupled to the receiver, the first and second ones of the set of signals to determine if a comparison exceeds a similarity threshold;

determining a proximity measure, using a proximity device, in response to a determination that the first and second ones of the set of signals exceeding the similarity threshold, between the first network segment and the second network segment; and determining, based on determining the proximity measure is less than a proximity threshold, the first network segment and the second network segment as a pair of non-disjoint network segments.

17. The non-transitory CRM of claim 16, the operations further comprising:

configuring a first fiber path and a second fiber path, each comprising a plurality of network segments of the fiber-optic network, between a source and a destination such that if the first fiber path includes the first network segment, the second fiber path does not include the second network segment.

18. The non-transitory CRM of claim 16, wherein, the determining whether the comparison exceeds the similarity threshold further comprises:

normalizing the first and second ones of the set of signals to eliminate variability between the first and second ones of the set of signals due to a difference in lengths of the first network segment and the second network segment; and determining a correlation coefficient between normalized first one of the set of signals and normalized second one of the set of signals.

19. The non-transitory CRM of claim 18, wherein the first and second ones of the set of signals are normalized using a dynamic time warping technique.

20. The non-transitory CRM of claim 16, wherein the proximity measure between the first network segment and the second network segment is determined based on a keyhole markup language zipped (KMZ) file.

* * * * *